(12) United States Patent
Towne

(10) Patent No.: US 7,178,258 B2
(45) Date of Patent: Feb. 20, 2007

(54) METHOD OF AND AN APPARATUS FOR ESTABLISHING A GOLF PRACTICE RANGE

(75) Inventor: Mark Anthony Towne, 2218 Gill Village Way, Apt. 202, San Diego, CA (US) 92108

(73) Assignee: Mark Anthony Towne, San Diego, CA (US)

(*) Notice: Subject to any disclaimer, the term of this patent is extended or adjusted under 35 U.S.C. 154(b) by 20 days.

(21) Appl. No.: 11/105,664

(22) Filed: Apr. 14, 2005

(65) Prior Publication Data
US 2006/0230628 A1    Oct. 19, 2006

Related U.S. Application Data

(60) Provisional application No. 60/562,827, filed on Apr. 16, 2004.

(51) Int. Cl.
G01B 3/12 (2006.01)
A63B 47/02 (2006.01)

(52) U.S. Cl. .......................... 33/772; 294/19.2
(58) Field of Classification Search .............. 33/772, 33/775, 779–782; 294/19.2; 473/132, 137
See application file for complete search history.

(56) References Cited

U.S. PATENT DOCUMENTS

| 3,196,545 A | | 7/1965 | Zell et al. .................... 33/782 |
| 3,355,101 A | * | 11/1967 | Levinson ...................... 33/782 |
| 3,441,209 A | * | 4/1969 | Farman ........................ 33/772 |
| 3,629,557 A | * | 12/1971 | Lareau ......................... 33/772 |
| 3,643,860 A | * | 2/1972 | Murphy et al. ............ 235/95 R |
| 4,532,710 A | * | 8/1985 | Kinney et al. ................ 33/772 |
| 4,680,454 A | * | 7/1987 | Zeaman et al. ........... 235/95 B |
| 5,335,953 A | | 8/1994 | Luther, Sr. ................. 294/19.2 |
| 5,749,522 A | * | 5/1998 | Smrt ............................ 33/781 |
| 6,142,544 A | | 11/2000 | Benzoni et al. ........... 294/19.2 |
| 7,040,036 B1 | * | 5/2006 | Wang ........................... 33/782 |
| 2002/0171253 A1 | * | 11/2002 | Deininger .................. 294/19.2 |
| 2003/0208921 A1 | | 11/2003 | Hall et al. .................... 33/708 |
| 2004/0026941 A1 | * | 2/2004 | Deininger .................. 294/19.2 |

* cited by examiner

Primary Examiner—G. Bradley Bennett
(74) Attorney, Agent, or Firm—James Ray & Assoc.

(57) ABSTRACT

An apparatus for establishing a golf practice range by at least one of measuring distances for such practice range and gathering golf balls from such practice range. The apparatus comprises a frame, the frame includes a handle member and an axle member that is engageable with a bottom portion of the frame. There is a pair of wheels having a predetermined diameter, each of the pair of wheels is disposed closely adjacent an outer edge of the axle member and a shag bag having a predetermined shape engageable with the frame. The apparatus has a means, disposed on the axle member, for measuring distance.

19 Claims, 3 Drawing Sheets

METHOD OF AND AN APPARATUS FOR ESTABLISHING A GOLF PRACTICE RANGE

CROSS REFERENCE TO RELATED APPLICATIONS

This application is closely related to and claims benefit from U.S. Provisional Application Ser. No. 60/562,827 filed on Apr. 16, 2004.

FIELD OF THE INVENTION

The present invention relates, in general, to an apparatus, used in practicing golf, and more particularly, the present invention relates to an apparatus designed to measure distances on a practice range and to assist in retrieving golf balls into a shag bag.

BACKGROUND OF THE INVENTION

When a golfer wishes to practice hitting golf balls, such golfer has limited options. The golfer may go to a driving range, or to a location suitable to practice golf shots, such as a park or an open, grassy area such as a field. There are problems; however, with most golf ranges. One of these is the expense involved with hitting only a small bucket of golf balls, while another problem is the inconvenience of the location and times of operation of the such golf driving range. Further, many golf driving ranges have unsuitable practice conditions, such as hitting the ball off or rubber or grass mats rather than hitting the balls off of real grass.

City or state parks and open grassy areas simulate more realistic golf course conditions where the golfer can hit off of grass which more nearly simulates the fairway conditions found on a golf course. However, in these areas there are no markers to indicate the distance, so a golfer is left to wonder how far his golf ball traveled. In addition, retrieving the golf balls after the golfer has hit a bag full can often be a tedious task because many shag bags can not stand on their own and thus the golfer is constantly bending over to pick up the golf balls and putting the balls in the bag.

SUMMARY OF THE INVENTION

In a first aspect the present invention provides an apparatus for establishing a golf practice range by at least one of measuring distances for such practice range and gathering golf balls from such practice range. The apparatus comprises a frame, the frame includes a handle member and an axle member that is engageable with a bottom portion of the frame. There is a pair of wheels having a predetermined diameter, each of the pair of wheels disposed closely adjacent an outer edge of the axle member and a shag bag having a predetermined shape engageable with the frame. The apparatus has a means, disposed on the axle member, for measuring distance.

In a second aspect of the invention there is a method for establishing a golf practice range by at least one of measuring distances for such practice range and gathering golf balls from such practice range. The method comprises the steps of selecting an area for establishing such practice range. Such area could be a field, a park or wherever there is sufficient area to hit golf balls. There is a step of measuring at least one distance from a golf driving area by counting revolutions of a wheel having a predetermined diameter. The distance is measured so that the golfer will have an idea as to the club to use and how well the ball is hit. There is a step of placing a flag stick at the at least one distance measured in the previous step. The flag stick or flag sticks are placed at measured distances so the golfer can see the distance to the various measured points. There is a step of using the golf practice range established in previous steps for hitting golf balls.

OBJECTS OF THE INVENTION

It is, therefore, one of the primary objects of the present invention to provide an apparatus that can be used to measure distances.

Another object of the present invention is to provide an apparatus which can be used to carry markers to indicate distance measured.

Yet, another object of the present invention is to provide an apparatus which will permit the shag bag to be rolled rather being carried.

Still another object of the present invention is to provide an apparatus which will permit such shag bag to stand up rather than lying horizontally when not in use.

Another object of the present invention is to provide an apparatus which will permit the retrieving of golf balls without requiring the golfer to bend over to pick up the golf balls.

In addition to the various objects and advantages of the invention which have been described in some specific detail above it should be noted that various other objects and advantages of the present invention will become more readily apparent to those persons who are skilled in the relevant art from the following more detailed description, particularly, when such description is taken in conjunction with the attached drawing Figures and with the appended claims.

Figure 1:
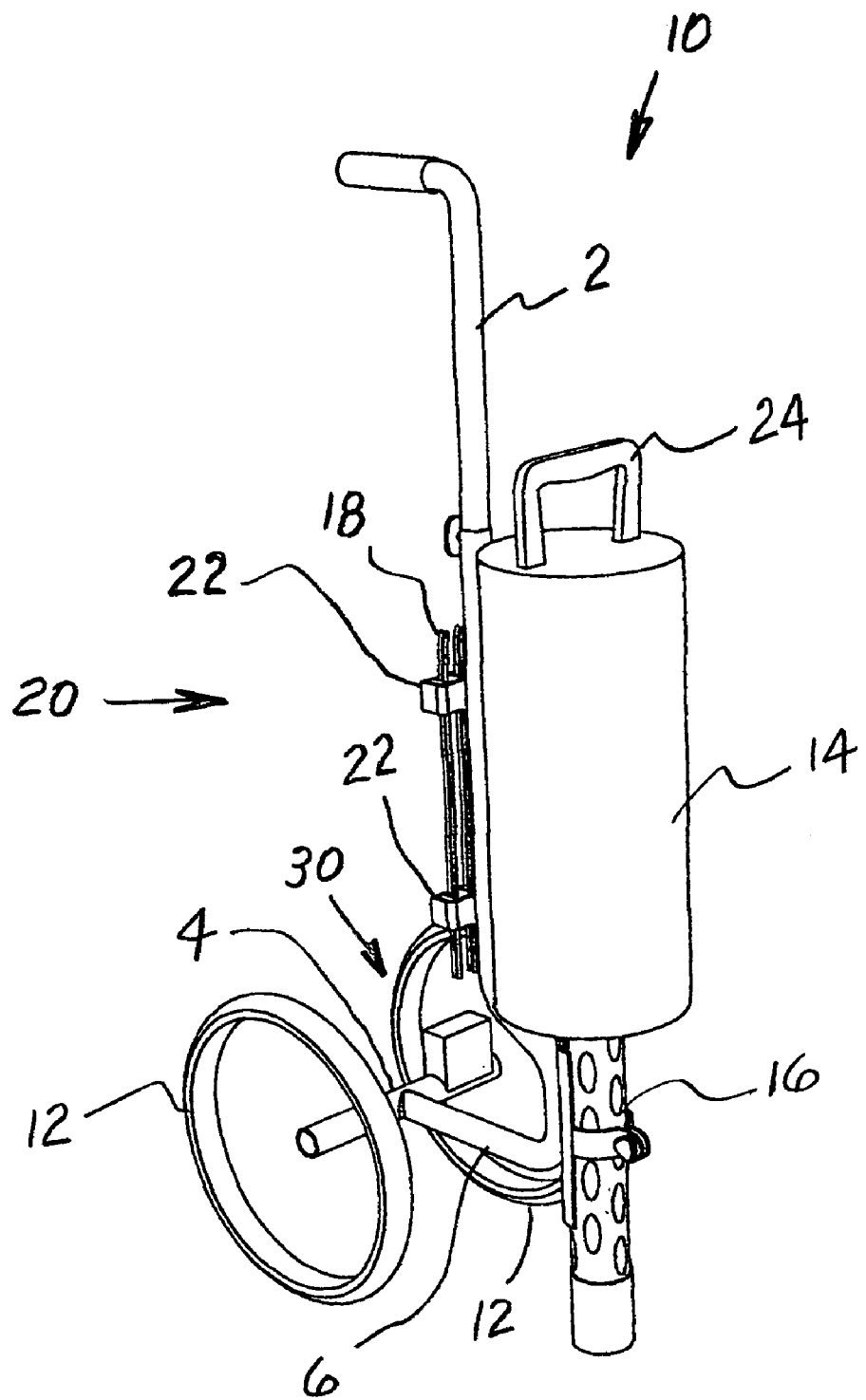
FIG. 1 is a partial perspective view from the front of the apparatus according to an embodiment of the invention.

BRIEF DESCRIPTION OF THE PRESENTLY PREFERRED AND VARIOUS ALTERNATIVE EMBODIMENTS OF THE INVENTION

Prior to proceeding to the more detailed description of the invention, it should be noted that identical components having identical functions have been designated with identical reference numerals throughout the several views illustrated in the drawings for the sake of clarity.

Figure 2:
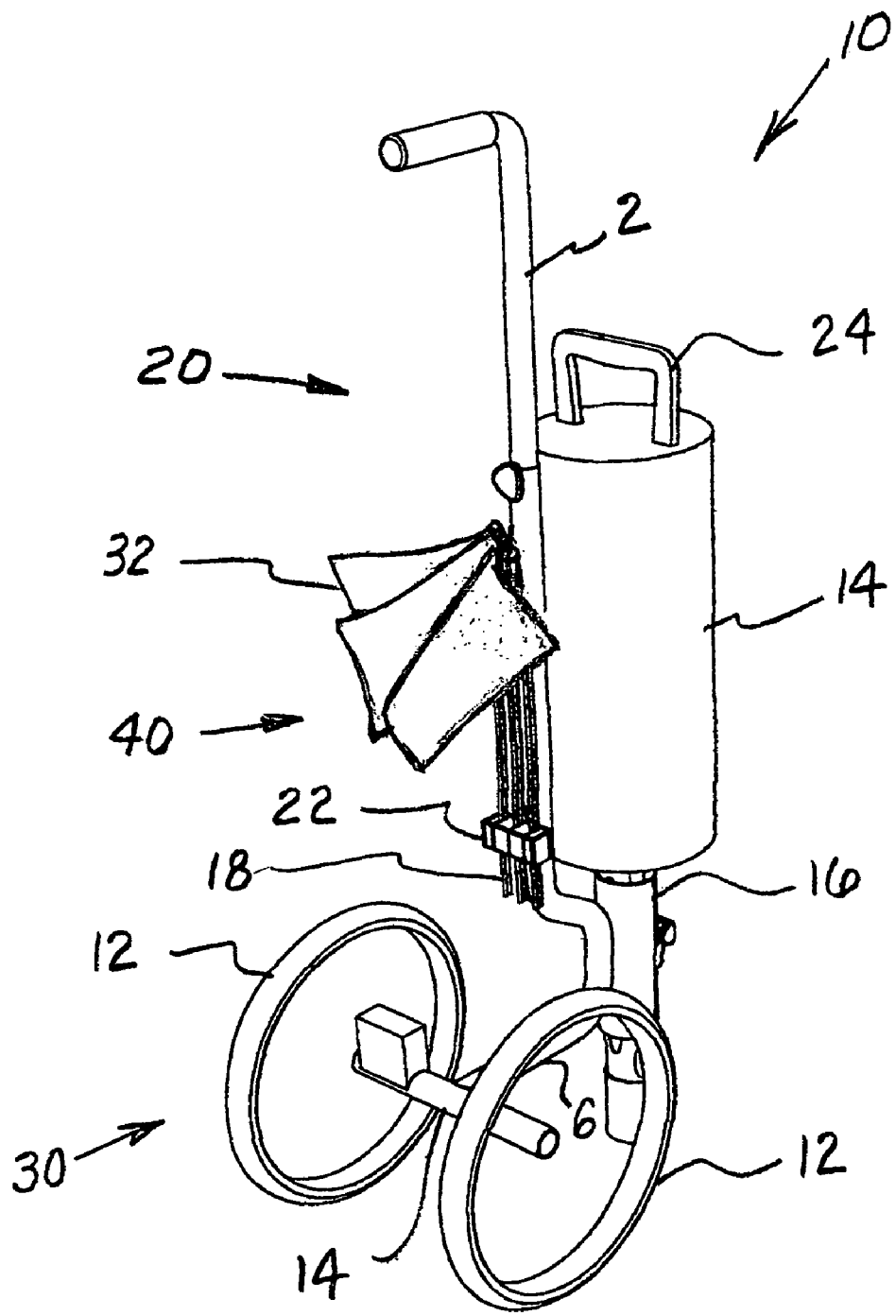
FIG. 2 is a partial perspective view from the rear of the apparatus that is shown in FIG. 1.
Figure 3:
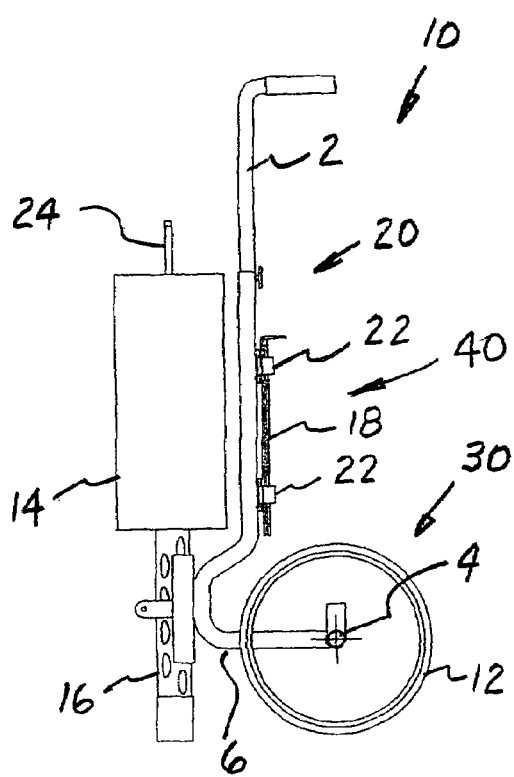
FIG. 3 is a side elevation view of the apparatus shown in FIG. 1.
Figure 4:
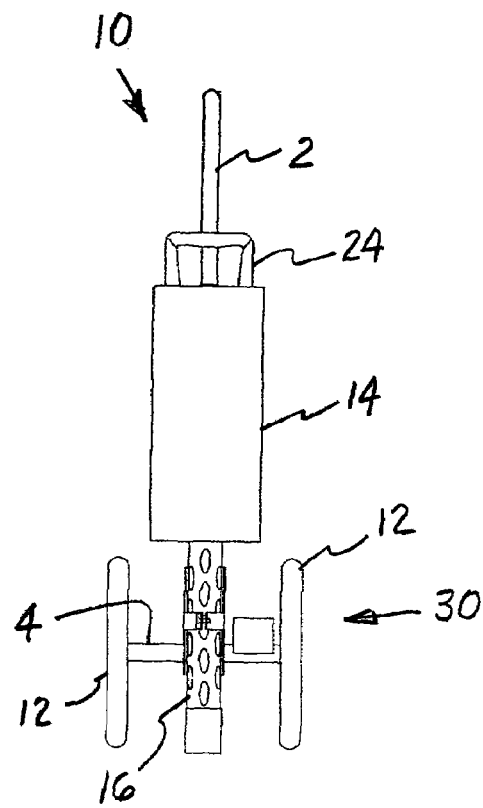
FIG. 4 is front view of the apparatus shown in FIG. 1.
Figure 5:
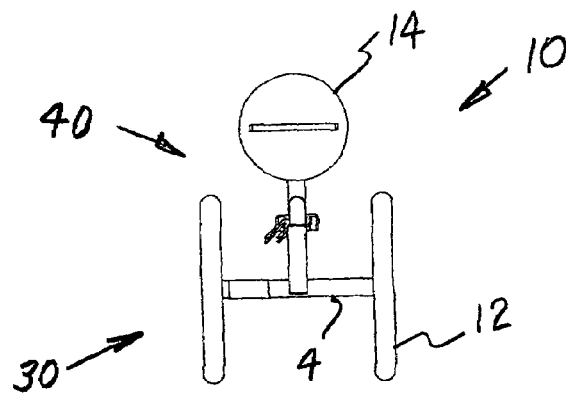
FIG. 5 is top view of the apparatus shown in FIG. 1.

Now reference is made, more particularly, to drawing FIGS. 1 and 2. Illustrated therein is an apparatus, generally designated 10, according to an embodiment of the invention. Such apparatus 10 is for establishing a golf practice range by at least one of measuring distances for such practice range and gathering golf balls from such practice range.

The apparatus 10 comprises a frame, generally designated 20. Such frame includes a handle member 2 and an axle member 4 that is engageable with a bottom portion 6 of the frame 20. It is presently preferred that such handle member 2 be adjustable so the height could be adjusted to fit golfers of different heights. The apparatus 10 includes a pair of wheels 12 having a predetermined diameter, each of the pair of wheels 12 is disposed closely adjacent an outer edge of the axle member 4.

There is a shag bag 14 which has a predetermined shape and is engageable with the frame 20 and a means, generally designated 30, that is disposed on the axle member 4 for measuring distance.

Such predetermined shape of the shag bag is one of rectangular, hexagonal, octagonal and cylindrical. In a preferred embodiment of the invention such shag bag 14 is cylindrical. Such shag bag 14 also includes a removable cover 24.

The shag bag 14 further includes an extension 16, having a second predetermined shape, that is engageable with and extending downwardly from the shag bag 14, the extension 16 is used for retrieving golf balls. The predetermined shape of such extension 16 is one of a square, hexagonal, octagonal and tubular. It is important that such shape, whatever shape it may be, is able to hold onto a golf ball, so there must be sufficient contact between the golf ball and the extension 16 so that the golf ball is retained. It is presently preferred that such extension 16 is tubular since being tubular provides the greatest contact with such golf ball. The extension 16 retrieves such golf balls by placing such tubular extension 16 over a golf ball and permitting such golf ball to enter the tubular extension 16.

The means 30 for measuring distance is disposed on the axle 4 member closely adjacent one of the pair of wheels. It is presently preferred that the means 30 is placed on the axle 4 closely adjacent such left wheel 12. The means 30 determines distance by counting the number of revolutions which the wheel 12 turns as the distance is being measured. The distance can be determined since the wheel has a predetermined diameter, or really circumference, and each revolution travels a certain distance. In a preferred embodiment of the invention the predetermined diameter of such wheel 12 is such that the circumference of the wheel 12 as it makes one revolution covers one yard or 36 inches. Thus, the predetermined diameter of the wheel is substantially 5 and ¾ inches. Having the circumference of the wheel 12 being one yard makes measurement quite easily since the number of revolutions of the wheel will equal the yardage from the starting point to measured point.

The apparatus 10 also includes a second means, generally designated 40, for holding a plurality of flag sticks 18 for marking the point that was measured. The flag stick 18 would have a flag or banner 32 attached to it so as to simulate the flag stick on a green giving the golfer something to aim at. Each of such flag 32 may be a different color, for example, one flag 32 may be red, while another could be blue and yet a third one may be white.

Such second means 40 is engageable with said frame 20 for holding the plurality of flag sticks 18 to be used as yardage markers. Such second means includes at least one bracket member 22. It is preferred that there are two bracket members 22.

In an alternate embodiment of the invention there is provided a method for establishing a golf practice range by at least one of measuring distances for such practice range and gathering golf balls from such practice range. The method comprises the steps of selecting an area for establishing such practice range. Such area could be a field, a park or wherever there is sufficient area to hit golf balls. There is a step of measuring at least one distance from a golf driving area by counting revolutions of a wheel having a predetermined diameter. The distance is measured so that the golfer will have an idea as to the club to use and how well the ball is hit. A step of placing a flag stick at the at least one distance measured in the previous step. The flag stick or flag sticks are placed at measured distances so the golfer can see the distance to the various measured points. It is within the scope of the invention that such flag sticks have flags of different color on them so, for example, red may denote a given distance, blue a different distance and white a third distance. Such distances might be 100 yards, 150 yards and 200 yards.

There is a step of using the golf practice range established in previous steps for hitting golf balls and finally there is a step of retrieving golf balls hit in the previous step by using a means which will pick up such golf balls and secure the golf balls inside.

While a presently preferred embodiment and alternate embodiments of the present invention have been described in detail above, it should be understood that various other adaptations and/or modifications of the invention can be made by those persons who are particularly skilled in the art without departing from either the spirit of the invention or the scope of the appended claims.

I claim:

1. An apparatus for establishing a golf practice range by at least one of measuring distances for such practice range and gathering golf balls from such practice range, said apparatus comprising:
   (a) a frame, said frame including;
      (i) a handle member;
      (ii) an axle member engageable with a bottom portion of said handle member;
   (b) a pair of wheels having a predetermined diameter, each of said pair of wheels disposed closely adjacent an outer edge of said axle member;
   (c) a shag bag having a predetermined shape engageable with said handle member; and
   (d) a means, disposed on said axle member, for measuring distance by counting revolutions turned by said pair of wheels.

2. The apparatus, according to claim 1, wherein said predetermined shape of said shag bag is one of rectangular, hexagonal, octagonal and cylindrical.

3. The apparatus, according to claim 2, wherein said predetermined shape of said shag bag is cylindrical.

4. The apparatus, according to claim 1, wherein said shag bag further includes an extension, having a second predetermined shape, engageable with and extending downwardly from said shag bag, said extension used for retrieving golf balls.

5. The apparatus, according to claim 4, wherein said predetermined shape of said extension is one of a square, hexagonal, octagonal and tubular.

6. The apparatus, according to claim 4, wherein said predetermined shape of said extension is tubular.

7. The apparatus, according to claim 6, wherein said tubular extension retrieves golf balls by placing such tubular extension over a golf ball and permitting such golf ball to enter the tubular extension.

8. The apparatus, according to claim 1, wherein said means for measuring distance is disposed on said axle member closely adjacent one of said pair of wheels.

9. The apparatus, according to claim 1, wherein said means for measuring distance determines such distance from each revolution of one of said pair of wheels.

10. The apparatus, according to claim 1, wherein said predetermined diameter of said pair of wheels is determined so that such circumference of said pair of wheels is substantially one yard.

11. The apparatus, according to claim 10, wherein said predetermined diameter of said pair of wheels is substantially 5 and ¾ inches.

12. The apparatus, according to claim 1, wherein said handle member is adjustable.

13. The apparatus, according to claim 1, wherein said apparatus further includes a second means engageable with said frame for holding a plurality of flag sticks to be used as yardage markers.

14. The apparatus, according to claim 13, wherein said second means engageable with said frame includes at least one bracket member.

15. A method for establishing a golf practice range by at least one of measuring distances for such practice range and gathering golf balls from such practice range, said method comprising the steps of:
  (a) selecting an area for establishing such practice range;
  (b) measuring at least one distance from a golf hitting area by counting revolutions of a wheel having a predetermined diameter;
  (c) placing a flag stick at said at least one distance measured in step (b);
  (d) using said golf practice range established in previous steps (a), (b), and (c) for hitting golf balls.

16. The method, according to claim 15, wherein said method further includes the step of retrieving golf balls hit in step (d) by using a means which will pick up and hold such golf balls.

17. The method, according to claim 15, wherein said hitting area includes at least one of a driving area and a pitching area.

18. The method, according to claim 16, wherein said driving area includes an area for placing tees for driving.

19. The method, according to claim 16, wherein said step (c) of placing a flag stick includes placing a plurality of flag sticks at various distances measured in step (b).

* * * * *